United States Patent Office 3,178,340
Patented Apr. 13, 1965

3,178,340
ANIMAL QUIETING COMPOSITION AND
METHOD OF USING SAME
Michael Mullen Robison, Berkeley Heights, and Robert Armistead Lucas, Mendham, N.J., assignors to Ciba Corporation, a corporation of Delaware
No Drawing. Filed May 26, 1961, Ser. No. 112,751
20 Claims. (Cl. 167—53)

The handling of poultry, livestock, game birds and pets, particularly at the time of vaccination, shipment, debeaking, killing, etc., still poses a major problem and represents a source of injuries, economic losses and the like. It has been found that the ester alkaloid reserpine and analogous substances, derived from Rauwolfia plants, are quite effective in quieting animals; feed mixtures containing such alkaloids have been accepted in the art. The advantage these alkaloids have over synthetically produced quieting and tranquilizing agents is above all their effectiveness in minute amounts, which apparently leave no traces in the body of the treated animals, and meat from the latter can, therefore, be made available to the markets.

However, the above-mentioned alkaloids have several drawbacks which severely hamper the full utilization of their valuable pharmacological effects. Thus, the onset of the latter is delayed for hours, i.e., handling of the animals can be carried out only four to six hours after feeding, and the duration of these effects is uncontrollably long, i.e., the animals are under tranquilization for days, and this prolonged sedation can lead to some cumulative effects. Secondly, reserpine and analogous alkaloids are practically insoluble in water and are, therefore, not suitable for use in drinking water. Treatment by way of the drinking water would be particularly desirable because, by withdrawing the drinking water over a certain time and then applying medicated water, a uniform effect over a whole flock or herd could be easily obtained.

In view of the above-mentioned disadvantages exhibited by the pharmacologically effective reserpine and analogs, it is therefore still desirable to find substances which retain the high pharmacological effectiveness of these alkaloids and which, at the same time, show a more rapid onset and a definite duration of the pharmacological effects, and are preferably water soluble.

We have now found that 18α-etherified hydroxy-3-epi-allo-yohimbane 16β-carboxylic acid esters, N-oxides thereof, and especially the acid addition salts of such compounds, show tranquilizing and quieting effects comparable to those of the ester alkaloid reserpine and its analogs. At the same time, this effect is of much faster onset and is limited in duration inasmuch as tranquilization wears off within twenty-four hours and has disappeared completely after that period. Furthermore, it has also been found that those compounds and particularly their acid addition salts are water-soluble substances and are, therefore, especially suited for the use in drinking water.

The quieting effects of the above compounds in livestock animals, e.g., cattle, horses, sheep, goats, hogs and the like, and particularly in poultry birds, such as chickens, turkeys, geese, ducks and the like, or pet animals, e.g., dogs, cats, pet birds, such as parakeets and the like, are such that the animals can be caught readily and can be handled shortly after treatment without undue excitement. Furthermore, application of feed or drinking water containing an effective amount of one of the above-mentioned compounds to herds or flocks minimizes or even eliminates mass hysteria during the process of handling, facilitates and expedites the slaughtering processes, saves labor and reduces injuries to handling personnel and losses from bruising. In view of their different properties when compared with those of reserpine and other ester alkaloids used in livestock and poultry feeds, the above-described compounds offer unexpected and highly desirable advantages when used in feeds and drinking water.

Generally, compounds used in the compositions of this invention are those of the formula:

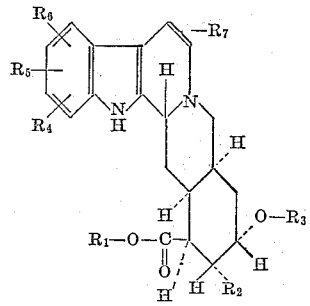

in which $R_1$ represents an aliphatic radical, primarily lower alkyl, as well as a substituted aliphatic radical, primarily substituted lower alkyl, such as, for example, monocyclic carbocyclic aryl-lower alkyl, e.g. phenyl-lower alkyl and the like, etherified hydroxy-lower alkyl, e.g. lower alkoxy-lower alkyl and the like, tertiary amino-lower alkyl, e.g. N,N-di-lower alkylamino-lower alkyl and the like $R_2$ stands primarily for lower alkoxy, as well as for hydrogen or cyano, $R_3$ represents an aliphatic radical, primarily lower alkyl, as well as lower alkenyl, lower alkynyl and the like, including a cycloaliphatic radical, such as cycloalkyl or cycloalkenyl, or a substituted aliphatic radical, particularly substituted lower alkyl, which is substituted, for example, by a cycloaliphatic radical, such as cycloalkyl or cycloalkenyl, carbocyclic aryl, such as monocyclic carbocyclic aryl and the like, hydroxyl, etherified hydroxyl, especially lower alkoxy and the like, esterified hydroxyl, such as lower alkoxy-carbonyloxy, lower alkanoyloxy, carbocyclic aryl-carbonyloxy, carbocyclic aryl-lower aliphatic hydrocarbon-carbonyloxy, halogeno and the like, acyl, such as lower alkanoyl, carbo-lower alkoxy and the like, mercapto, etherified mercapto, such as lower alkyl-mercapto and the like, tertiary amino, for example, N,N-di-lower alkyl-amino and the like, a heterocyclic, particularly a monocyclic heterocyclic, radical, or any other analogous group suitable for being attached to an aliphatic radical, each of the radicals $R_4$, $R_5$ and $R_6$ stands for hydrogen, aliphatic hydrocarbon, particularly lower alkyl and the like, substituted aliphatic hydrocarbon, particularly substituted lower alkyl, such as halogeno-lower alkyl, especially trifluoromethyl, etherified hydroxyl, particularly lower alkoxy, as well as cycloalkyloxy, cycloalkyl-lower alkoxy, carbocyclic aryloxy, carbocyclic aryl-lower alkoxy or any other analogous etherified hydroxy group, esterified hydroxyl, particularly halogeno, as well as lower alkoxy-carbonyloxy, lower alkanoyloxy and the like, etherified mercapto, particularly lower alkyl-mercapto, nitro, amino, e.g. N,N-di-substituted amino and the like, or, whenever two of the groups $R_4$, $R_5$ and $R_6$ are attached to two adjacent positions and are taken together, for lower alkylenedioxy, and $R_7$, attached to one of the positions 5 and 6, stands for hydrogen or lower alkyl, salts, N-oxides or salts of N-oxides of such compounds, as well as process for the preparation of such compounds.

The aliphatic radical $R_1$ in the above formula stands above all for lower alkyl having from one to ten, preferably from one to four, carbon atoms; such groups are particularly methyl, ethyl, n-propyl, isopropyl, n-butyl, isobutyl, secondary butyl and the like, as well as n-pentyl, isopentyl, n-hexyl, n-heptyl and the like.

The esterifying portion of the ester grouping $R_1$ in the above formula may also stand for a substituted aliphatic, particularly substituted lower alkyl, radical, such as, for example, monocyclic carbocyclic aryl-lower alkyl, in which lower alkyl has from one to four carbon atoms, such as phenyl-lower alkyl, e.g. benzyl, 1-phenylethyl, 2-phenylethyl and the like, or phenyl-lower alkyl, in which phenyl is substituted by lower alkyl, e.g. methyl, ethyl and the like, lower alkoxy, e.g. methoxy, ethoxy and the like, halogeno, e.g. fluoro, chloro, bromo and the like, or any other suitable substituent.

Other substituted aliphatic, particularly lower alkyl, radicals are aliphatic, especially lower alkyl, radicals substituted by functional groups, such as etherified hydroxyl, particularly lower alkoxy having preferably from one to four carbon atoms, e.g. methoxy, ethoxy, n-propyloxy, isopropyloxy, n-butyloxy and the like, or tertiary amino, particularly N,N-di-lower alkylamino, in which lower alkyl has from one to four carbon atoms, e.g. N,N-dimethylamino, N-ethyl - N - methylamino, N,N-diethylamino, N,N-di-n-propylamino, N,N - di - isopropylamino and the like, as well as 1-N,N-alkylene-imino, in which alkylene has from four to six ring carbon atoms, e.g. 1-pyrrolidino, 1 - piperidino, 1-N,N-hexamethyleneimino and the like, 1-N,N-oxa-alkylene-imino, in which oxaalkylene has preferably four ring carbon atoms, e.g. 4-morpholino and the like, N,N-thia-alkylene-imino, in which alkylene has preferably four carbon atoms, e.g. 4-thiamorpholino and the like, or 1-N,N-aza-alkyleneimino, in which aza-alkylene has from four to six ring carbon atoms, particularly 4-lower alkyl-1-piperazino, e.g. 4-methyl-1-piperazino, 4-ethyl-1-piperazino and the like, or any other suitable functional group. The aliphatic, particularly the lower alkyl, portion in an aliphatic, especially lower alkyl, radical substituted by functional groups, such as in an etherified hydroxy-lower alkyl radical, or in a tertiary amino-lower alkyl radical and the like, is represented by a lower alkylene radical, which contains at least two, preferably from two to three, carbon atoms, separating the functional group, such as etherified hydroxy, tertiary amino and the like, from the 16β-carboxyl group in the molecule by at least two, preferably by from two to three, carbon atoms. Such alkylene radicals are primarily 1,2-ethylene, 1-methyl-1,2-ethylene, 2-methyl - 1,2 - ethylene, 1,3-propylene, as well as 1,4-butylene and the like. Aliphatic, particularly lower alkyl radicals containing functional groups, which radicals are represented by $R_1$ in the above formula, may be primarily lower alkoxy-lower alkyl, in which lower alkyl has from two to three carbon atoms and separates the lower alkoxy group from the 16β-carboxyl group in the molecule by at least two carbon atoms, for example, 2-lower alkoxyethyl, e.g. 2-methoxy-ethyl, 2-ethoxyethyl and the like, 2-lower alkoxy-propyl, e.g. 2-methoxy-propyl and the like, 3-lower alkoxy-propyl, e.g. methoxypropyl, 3-ethoxypropyl and the like. Other substituted aliphatic, particularly lower alkyl radicals, are, for example, N,N-di-lower alkyl-amino-lower alkyl, in which lower alkyl carrying the N,N - di - lower alkyl - amino group has from two to three carbon atoms and separates the N,N-di - lower alkyl - amino group from the 16β - carboxyl group in the molecule by at least two carbon atoms, for example, 2 - N,N - di - lower alkyl-ethyl, e.g. 2-N,N-dimethylaminoethyl, 2-N,N-diethylaminoethyl and the like, 2-N,N-di-lower alkyl-amino-propyl, e.g. 2-N,N-diethylaminopropyl and the like, 3-N,N-di-lower alkyl-amino-propyl, e.g. 3-N,N-dimethylaminopropyl, 3-N,N - diethylaminopropyl and the like, N,N - alkyleneimino--lower alkyl, in which lower alkyl has from two to three carbon atoms and separates the N,N-alkyleneimino group from the 16β-carboxyl group in the molecule by at least two carbon atoms, and alkylene contains from four to seven carbon atoms, such as 2-(1-N,N-alkylene-imino)-ethyl, e.g. 2-(1-pyrrolidino)-ethyl, 2-(1-piperidino)-ethyl and the like, 2-(N,N-alkylene-imino)-propyl, e.g. 2-(1-pyrrolidino)-propyl, 2-(1-piperidino)-propyl and the like, 3-(1-N,N-alkylene-imino)-propyl, e.g. 3 - (1 - piperidino)-propyl, 3-(1-N,N-hexamethylene-imino)-propyl and the like, or any other suitable tertiary amino-lower alkyl radical.

The substituent $R_2$ attached to the 17α-position represents lower alkoxy which contains preferably from one to four carbon atoms, and stands primarily for methoxy, as well as ethoxy, n-propyloxy, isopropyloxy, n-butyloxy, isobutyloxy and the like. It may also stand for hydrogen or cyano.

The etherified hydroxy group $R_3$—O— of the previously-given formula is etherified by an aliphatic radical, including a cycloaliphatic or a substituted aliphatic radical. These radicals stand, above all, for lower alkyl, containing from one to ten, preferably from one to seven, carbon atoms such as, for example, methyl, ethyl, n - propyl, isopropyl, n - butyl, isobutyl, secondary butyl, n-pentyl, isopentyl, neopentyl, n-hexyl, isohexl, n-heptyl, n-oxtyl, n-nonyl, n-decyl and the like.

Other etherified 18-hydroxyl groups have as the group $R_3$ other aliphatic radicals, such as, for example, lower alkenyl, particularly lower allylic alkenyl, containing preferably from three to five carbon atoms, e.g. allyl, 2-methyl-allyl, 2-butenyl, 3-methyl-2-butyenyl, 2-pentenyl and the like, lower alkynyl, e.g. propargyl and the like, or cycloaliphatic radicals, such as cycloalkyl containing from three to eight, ring carbon atoms, e.g. cyclopropyl, cyclobutyl, cyclopentyl, cyclohexyl, cycloheptyl, cyclooctyl, and the like, or cycloalkenyl, containing preferably from five to eight ring carbon atoms, e.g. 3-cyclopentenyl, 2-cyclohexenyl and the like.

Aliphatic radicals represented by $R_3$ may contain substituents, such as, for example, cycloaliphatic radicals. Accordingly, substituted aliphatic radicals may be represented by cyclo-aliphatic-aliphatic radicals, for example, by cycloalkyl-lower alkyl, in which cycloalkyl contains from three to eight ring carbon atoms, and lower alkyl contains from one to four carbon atoms, e.g. cyclopropylmethyl, 2-cyclopropylethyl, cyclobutylmethyl, cyclopentylmethyl, 1 - cyclopentylethyl, 2 - cyclopentylethyl, 3 - cyclopentylpropyl, cyclohexylmethyl, 2-cyclohexylethyl and the like, cycloalkyl-lower alkenyl, in which cycloalkyl has the above-given meaning, and lower alkenyl contains preferably from three to five carbon atoms, e.g. 3-cyclopropyl-allyl, 3 - cyclopentyl - allyl and the like, cycloaikenyl-lower alkyl, in which cycloalkenyl contains from five to eight ring carbon atoms, and lower alkyl has from one to four carbon atoms, e.g. 2-(1-cyclopentenyl)-ethyl, 2-cyclohexenylmethyl, 3-cyclohexenylmethyl and the like.

Other substituted aliphatic radicals contain as substituents carbocyclic aryl groups and represent, for example, carbocyclic aryl-aliphatic radicals, such as monocyclic carbocyclic aryl-lower alkyl, particularly phenyl-lower alkyl, e.g. benzyl, diphenylmethyl, 1-phenylethyl, 2-phenylethyl and the like, as well as carbocyclic-lower alkenyl, such as monocyclic carbocyclic aryl-lower alkenyl, particularly phenyl-lower alkenyl, e.g. 3-phenylallyl and the like, or anologous radicals, in which the carbocyclic aryl nucleus is substituted by one or more than one of the same or different substituents, for example, by lower alkyl, e.g. methyl, ethyl and the like, lower alkoxy, e.g. methoxy, ethoxy and the like, lower alkenyloxy, e.g. allyloxy and the like, halogeno, e.g. fluoro, chloro, bromo and the like, lower alkoxy-carbonyloxy, e.g. methoxy-carbonyloxy, ethoxy-carbonyloxy and the like, halogeno-lower alkyl, e.g. trifluoromethyl and the like, nitro, amino, such as N,N-di-lower alkyl-amino, e.g. N,N-dimethylamino and the like, or any other suitable substituent.

Other substituted aliphatic radicals $R_3$ may be substituted by functional groups, particularly by hydroxyl or etherified hydroxyl. Aliphatic radicals containing hydroxyl groups are, for example, hydroxy-aliphatic radicals, such as hydroxy-lower alkyl, in which the hydroxyl group is separated from the 18-oxygen atom in the molecule by at least two carbon atoms, e.g. 2-hydroxyethyl, 2-hydroxypropyl, 3-hydroxypropyl, 4-hydroxybutyl, 5-hydroxypentyl and the like.

Etherified hydroxy-aliphatic radicals are primarily represented by lower alkoxy-lower alkyl, in which lower alkoxy contains from one to four carbon atoms, and stands, for example, for methoxy, ethoxy, n-propyloxy, isopropyloxy, n-butyloxy and the like, and in which the lower alkoxy group is separated from the 18-oxygen atom in the molecule by at least two carbon atoms; lower alkoxy-lower alkyl groups may be represented by 2-lower alkoxy-ethyl, e.g. 2-methoxyethyl, 2-ethoxyethyl, 2-isopropyloxyethyl and the like, 2-lower alkoxy-propyl, e.g. 2-methoxypropyl, 2-ethoxypropyl, 2-n-propyloxypropyl and the like, 3-lower alkoxypropyl, e.g. 3-methoxypropyl, 3-ethoxypropyl and the like, or any other analogous lower alkoxy-lower alkyl group.

Other etherified hydroxyl groups, which may substitute aliphatic, particularly lower alkyl, radicals are, for example, lower alkenyloxy, e.g. vinyloxy, allyloxy and the like, cycloalkyloxy, in which cycloalkyl has from three to eight ring carbon atoms, e.g. cyclopentyloxy, cyclohexyloxy and the like, cycloalkenyloxy, in which cycloalkenyl has from five to eight ring carbon atoms, e.g. 3-cyclohexenyloxy and the like, cycloalkyl-lower alkoxy, in which cycloalkyl has from three to eight ring carbon atoms, e.g. cyclopentylmethyloxy, 2-cyclohexylethyloxy and the like, lower alkoxy-lower alkoxy, e.g. 2-methoxy-ethoxy, 3-methoxy-propyloxy, and the like, ω-lower alkoxy-poly-lower alkyleneoxy, e.g. ω-methoxydiethyleneoxy, ω-ethoxy-diethyleneoxy, ω-methoxy-tetraethyleneoxy, ω-methoxy-nonaethyleneoxy, ω-methoxydodecaethyleneoxy and the like, or any other suitable etherified hydroxyl group. Aliphatic, particularly lower alkyl, groups carrying such etherified hydroxyl groups are, for example, lower alkenyloxy-lower alkyl, in which the lower alkenyloxy group is separated from the 18-oxygen atom in the molecule by at least two carbon atoms, for example, 2-lower alkenyloxy-ethyl, e.g. 2-vinyloxyethyl, 2-allyloxyethyl and the like, 2-lower alkenyloxypropyl, e.g. 2-vinyloxypropyl and the like, 3-lower alkenyloxypropyl, e.g. 3-vinyloxypropyl, 3-allyloxypropyl and the like, cycloalkyloxy-lower alkyl, in which cycloalkyloxy is separated from the 18-oxygen atom in the molecule by at least two carbon atoms, such as 2-cycloalkyloxy-ethyl, e.g. 2-cyclopentyloxy-ethyl and the like, 2-cycloalkyloxy-propyl, e.g. 2-cyclohexyloxy-propyl and the like, 3-cycloalkyl-propyl, e.g. 2-cyclopentyloxypropyl and the like, cycloalkenyloxy-lower alkyl, in which cycloalkenyloxy is separated from the 18-oxygen atom in the molecule by at least two carbon atoms, such as 2-cycloalkenyloxy-ethyl, e.g. 2-(2-cyclopentenyloxy)-ethyl and the like, 2-cycloalkenyloxy-propyl, e.g. 2-(3-cyclohexenyloxy)-propyl and the like, 3-cycloalkenyloxy-propyl, e.g. 3-(3 - cyclopentenyloxy)-propyl and the like, cycloalkyl-lower alkoxy-lower alkyl, in which cycloalkyl-lower alkoxy is separated from the 18-oxygen atom in the molecule by at least two carbon atoms, such as 2-(cycloalkyl-lower alkoxy)-ethyl, e.g. 2-cyclopentylmethyloxyethyl and the like, 2-(cycloalkyl-lower alkoxy)-propyl, e.g. 2-(2-cyclohexylethoxy)-propyl and the like, 3-(cycloalkyl-lower alkoxy)-propyl, e.g. 3-cyclohexyl-methoxy-propyl and the like, lower alkoxy-lower alkoxy-lower alkyl, in which lower alkoxy-lower alkoxy is separated from the 18-oxygen atom in the molecule by at least two carbon atoms, such as 2-(lower alkoxy-lower alkoxy)-ethyl, e.g. 2-(2 - methoxyethoxy)-ethyl, 2-(2-ethoxy-ethoxy)-ethyl, 2 - (2 - isopropyloxyethoxy)-ethyl and the like, 2-(lower alkoxy-lower alkoxy)-propyl, e.g. 2-(2-methoxyethoxy)-propyl, 2-(2-ethoxyethoxy)-propyl and the like, 3-(lower alkoxy-lower alkoxy)-propyl, e.g. 3-(2-methoxyethoxy)-propyl, 3-(2-ethoxyethoxy)-propyl and the like, (ω-lower alkoxy-poly-lower alkyleneoxy)-lower alkyl, in which ω-lower alkoxy-poly-lower alkyleneoxy is separated from the 18-oxygen atom in the molecule by at least two carbon atoms, such as 2-(ω-lower alkoxy-poly-lower alkyleneoxy)-ethyl, e.g. 2-(ω-methoxy-diethyleneoxy)-ethyl, 2-(ω-ethoxy-tetraethyleneoxy)-ethyl, 2-(ω-methoxy-nonaethyleneoxy)-ethyl and the like, 2-(ω-lower alkoxy-poly-lower alkyleneoxy)-propyl, e.g. 2-(ω-methoxy-triethyleneoxy)-propyl, 2 - (ω-ethoxy-tetraethyleneoxy)-propyl, 2 - (ω-methoxy-nonaethyleneoxy)-propyl and the like, 3-(ω-lower alkoxy-poly-lower alkyleneoxy)-propyl, e.g. 3 - (ω-methoxy-diethyleneoxy)-propyl, 3-(ω-ethoxy-tetraethyleneoxy)-propyl, 3 - (ω-methoxy-nonaethyleneoxy)-propyl and the like, or any other analogous aliphatic group carrying an etherified hydroxyl group.

Other substituted aliphatic, especially substituted lower alkyl, radicals $R_3$ have as substituents esterified hydroxyl groups, such as lower alkoxy-carbonyloxy, e.g. methoxy-carbonyloxy, ethoxy-carbonyloxy and the like, lower alkanoyloxy, e.g. acetoxy, propionyloxy and the like, carbocyclic aryl-carbonyloxy, particularly monocyclic carbocyclic aryl-carbonyloxy, e.g. benzoyloxy, and benzoyloxy, in which the carbocyclic aryl portion is substituted by the same or different substituents attached to any of the positions available for substitution, such as, for example, by lower alkyl, e.g. methyl, ethyl, isopropyl and the like, lower alkoxy, e.g. methoxy, ethoxy, n-butyloxy and the like, lower alkenyloxy, e.g. allyloxy and the like, halogeno, e.g. fluoro, chloro, bromo and the like, lower alkoxy-carbonyloxy, e.g. methoxy-carbonyloxy, ethoxy-carbonyloxy and the like, polyhalogeno-lower alkyl, e.g. trifluoromethyl and the like, nitro, amino, such as N,N-di-lower alkyl-amino, e.g. N,N-dimethylamino and the like, or any other suitable substituent, carbocyclic aryl-lower aliphatic hydrocarbon-carbonyloxy, such as monocyclic carbocyclic aryl-lower alkanoyloxy or monocyclic carbocyclic aryl-lower alkenoyloxy, e.g. phenyl-acetoxy, 3-phenyl-propionyloxy, cinnamoyloxy and the like, and these radicals substituted in the carbocyclic nucleus by one or more than one of the same or of different substituents, such as those mentioned hereinbefore, or halogeno (representing a hydroxyl group esterified with a hydro-halic acid), e.g. fluoro and the like. Aliphatic, particularly lower alkyl, radicals substituted by esterified hydroxyl groups, in which the esterified hydroxyl group is separated from the 18-oxygen atom of the molecule by at least two carbon atoms, may be represented, for example, by lower alkoxy-carbonyloxy-lower alkyl, in which the esterified hydroxyl group is separated from the 18-oxygen atom in the molecule by at least two carbon atoms, such as 2-lower alkoxy-carbonyloxy-ethyl, e.g. 2-methoxy-carbonyloxy-ethyl and the like, 2-lower alkoxy-carbonyloxy-propyl, e.g. 2-ethoxy-carbonyloxy-propyl and the like, 3-lower alkoxy-carbonyloxy-propyl, e.g. 3-methoxy-carbonyloxy-propyl and the like, lower alkanoyloxy-lower alkyl, in which the esterified hydroxyl group is separated from the 18-oxygen atom in the molecule by at least two carbon atoms, such as 2-lower alkanoyloxy-ethyl, e.g. 2-acetyloxy-ethyl, 2-propionyloxyethyl and the like, 2-lower alkanoyloxy-propyl, e.g. 2-acetyloxy-propyl and the like, 3-lower alkanoyloxy-propyl, e.g. 3-acetyloxy-propyl and the like, monocyclic carbocyclic aryl-carbonyloxy-lower alkyl, in which the esterified hydroxyl group is separated from the 18-oxygen atom in the molecule by at least two carbon atoms, such as, 2-monocyclic carbocyclic aryl-carbonyloxy-ethyl, e.g. 2 - benzoyloxy-ethyl, 2-(3,4,5-trimethoxy-benzoyloxy)-ethyl, 2 - (4 - ethoxycarbonyl-syringoyloxy)-ethyl and the like, 2-monocyclic carbocyclic aryl-carbonyloxy-propyl, e.g. 2-benzoyloxy-propyl and the like, 3-monocyclic carbocyclic aryl-carbonyloxy-propyl, e.g. 3-benzoyloxypropyl, 3-(3,4,5-trimethoxy-benzoyloxy)-propyl and the like, monocyclic carbocyclic aryl-lower alkanoyloxy-lower alkyl, in which the esterified hydroxyl group is separated from the 18-oxygen atom in the molecule by at least two carbon atoms, such as 2-monocyclic carbocyclic aryl-lower alkanoyloxy-ethyl, e.g. 2 - [3 - (3,4,5 - trimethoxy-phenyl)-propionyloxy]-ethyl and the like, 2-monocyclic carbocyclic aryl-lower alkanoyloxy-propyl, e.g. 2-phenylacetyloxy-propyl and the like, 3-monocyclic carbocyclic aryl-lower alkanoyloxy-propyl, e.g. 3-phenylacetyloxy-propyl and the like, monocyclic carbocyclic aryl-lower alkenoyloxy-lower alkyl, in which the esterified hydroxyl group is separated from the 18-oxygen atom in the molecule by at least two carbon atoms, such as 2-(monocyclic carbocyclic aryl-lower alkenyloxy)-ethyl, e.g. 2-cinnamoyloxyethyl and the like, 2-monocyclic carbocyclic aryl-lower alkenoyloxy-propyl, e.g. 2-cinnamoyloxy-propyl and the like, 3-(monocyclic carbocyclic aryl-lower alkenoyloxy)-propyl, e.g. 3 - (3,4,5 - trimethoxy-cinnamoyloxy)-propyl and the like, halogeno-lower alkyl, in which halogeno is separated from the 18-oxygen atom in the molecule by at least two carbon atoms such as, for example, 2-trifluoroethyl and the like.

Other aliphatic, particularly lower alkyl, radicals represented by $R_3$ may be substituted by acyl, particularly lower alkanoyl, e.g. acetyl, propionyl and the like, or carbo-lower alkoxy, e.g. carbomethoxy, carbethoxy and the like; such aliphatic radicals may be represented, for example, by lower alkanoyl-lower alkyl, e.g. acetonyl, butan-2-onyl, butan-3-onyl and the like, carbo-lower alkoxy-lower alkyl, e.g. carbomethoxy-methyl, 2-carbethoxyethyl and the like.

Additional aliphatic, particularly lower alkyl, radicals $R_3$ may be substituted by mercapto or etherified mercapto, such as lower alkyl-mercapto, e.g. methyl-mercapto, ethyl-mercapto and the like, and represent mercapto-lower alkyl, in which the mercapto group is separated from the 18-oxygen atom in the molecule by at least two carbon atom, e.g. 2-mercapto-ethyl, 2-mercaptopropyl, 3-mercaptopropyl and the like, or lower alkyl-mercapto-lower alkyl, in which lower alkyl-mercapto is separated from the 18-oxygen atom in the molecule by at least two carbon atoms, such as 2-lower alkylmercapto-ethyl, e.g. 2-methylmercaptoethyl, 2-ethylmercaptoethyl and the like, 2-lower alkyl-mercaptopropyl, e.g. 2-methylmercaptopropyl and the like, 3-lower alkylmercapto-propyl, e.g. 3-ethylmercaptopropyl and the like.

Still other aliphatic, particularly lower alkyl, radicals represented by the group $R_3$ may be substituted by amino, particularly tertiary amino, such as N,N-di-lower alkyl-amino, e.g. N,N-dimethylamino, N-ethyl-N-methyl-amino, N,N-diethyl-amino, N,N-di-n-propylamino, N,N-diisopropylamino, N,N-dibutylamino and the like, N,N-alkylene-imino, in which alkylene contains from four to seven carbon atoms, e.g. 1-pyrrolidino, 1-piperidino, 1-N,N-hexamethyleneimino and the like, N,N-oxa-alkylene-imino, in which alkylene contains primarily four carbon atoms, e.g. 4-morpholino and the like, N,N-thia-alkylene-imino, in which alkylene has primarily four carbon atoms, e.g. 4-thiamorpholino and the like, N,N-aza-alkylene-imino, in which alkylene contains from four to six ring carbon atoms, particularly 4-lower alkyl-1-piperazino, e.g. 4-methyl-1-piperazino, 4-ethyl - 1 - piperazino and the like. Aliphatic radicals substituted by a tertiary amino group are primarily tertiary amino-lower alkyl, such as N,N-di-lower alkyl-amino-lower alkyl, in which lower alkyl carrying the N,N-di-lower alkyl-amino group has from two to three carbon atoms and separates the tertiary amino group from the 18-oxygen atom in the molecule by at least two carbon atoms, for example, 2-N,N-di-lower alkyl-amino-ethyl, e.g. 2 - N,N-dimethyl-aminoethyl, 2-N,N-diethylamino-ethyl and the like, 2-N,N-di-lower alkyl alkylamino-propyl, e.g. 2-N,N-dimethylamino-propyl and the like, 3-N,N-di-lower alkyl-amino-propyl, e.g. 3-N,N-dimethylaminopropyl, 3-N,N-diethylaminopropyl and the like, 1-N,N-alkylene-imino-lower alkyl, in which lower alkyl has from two to three carbon atoms and separates the N,N-alkylene-imino group from the 18-oxygen atom in the molecule by at least two carbon atoms, and alkylene contains from four to seven carbon atoms, for example, 2-N,N-alkyleneimino-ethyl, e.g. 2-(1-pyrrolidino)-ethyl, 2-(1-piperidino)-ethyl and the like, 2-N,N-alkylene-imino-propyl, e.g. 2-(1-pyrrolidino)-propyl, and the like, 3-N,N-alkylene-imino-propyl, e.g. 3-(1-piperidino)-propyl and the like, 4-morpholino-lower alkyl, in which lower alkyl has from two to three carbon atoms and separates the morpholino group from the 18-oxygen atom in the molecule by at least two carbon atoms, such as 2-(4-morpholino)-ethyl, 2 - (4 - morpholino)-propyl, 3-(4-morpholino)-propyl and the like, (4-lower alkyl-1-piperazino)-lower alkyl, in which lower alkyl, carrying the 4-lower alkyl-1-piperazino group, has from two to three carbon atoms and separates the 4-lower alkyl-1-piperazino group from the 18-oxygen atom in the molecule by at least two carbon atoms, for example, 2-(4-lower alkyl-1-piperazino)-ethyl, e.g. 2-(4-methyl-1-piperazino)-ethyl, 2-(4-ethyl-1-piperazino)-ethyl and the like, 2-(4-lower alkyl-1-piperazino)-propyl, e.g. 2-(4-ethyl-1-piperazino)-propyl and the like, 3-(4-lower alkyl-1-piperazino)-propyl, e.g. 3-(4-methyl-1-piperazino)-propyl, 3-(4-ethyl-1-piperazino)-propyl and the like, as well as other analogous aliphatic radicals substituted by tertiary amino groups.

Aliphatic, particularly lower alkyl, radicals $R_3$ may also be substituted by heterocyclic groups, which are attached to the aliphatic, e.g. lower alkyl, radical through one of their ring carbon atoms. Such groups are, for example, monocyclic heterocyclic aryl groups, especially monocyclic azacyclic aryl groups, such as pyridyl, e.g. 2-pyridyl, 4-pyridyl and the like, thienyl, e.g. 2-thienyl and the like or monocyclic cyclo-heteroaliphatic groups, such as tetrahydrofuranyl, e.g. 2-tetrahydrofuranyl and the like. Aliphatic radicals substituted by a heterocyclic radical may be represented, for example, by pyridyl-lower alkyl, e.g. 2-pyridylmethyl, 2-(4-pyridyl)-ethyl, and the like, thienyl-lower alkyl, e.g. 2-thienyl and the like, tetrahydrofuranyl-lower alkyl, e.g. tetrahydrofurfuryl and the like.

The groups $R_4$, $R_5$ and $R_6$ (each of which also stands for hydrogen) may be, for example, lower aliphatic hydrocarbon, especially lower alkyl having preferably from one to four carbon atoms, e.g. methyl, ethyl, n-propyl, isopropyl, n-butyl, isobutyl, secondary butyl, tertiary butyl and the like, or functional groups, such as, for example, etherified hydroxyl, particularly lower alkoxy having preferably from one to four carbon atoms, e.g. methoxy, ethoxy, n-propyloxy, isopropyloxy, n-butyloxy, isobutyloxy, secondary butyloxy, tertiary butyloxy and the like, as well as lower alkenyloxy, e.g. allyloxy and the like, cycloalkyloxy, in which cycloalkyl has from three to eight, preferably from five to six, ring carbon atoms, e.g. cyclopentyloxy, cyclohexyloxy and the like, cycloalkyl-lower alkoxy, in which cycloalkyl has from three to eight, preferably from five to six, ring carbon atoms, e.g. cyclopentyl-methoxy, 2-cyclopentylethoxy, cyclohexylmethoxy and the like, carbocyclic aryloxy, such as monocyclic carbocyclic aryloxy, e.g. phenyloxy and the like, carbocyclic aryl-lower alkoxy, such as monocyclic carbocyclic aryl-lower alkoxy, for example, phenyl-lower alkoxy, e.g. benzyloxy, diphenylmethoxy, 2-phenylethoxy and the like, esterified hydroxyl, particularly halogeno (representing hydroxyl esterified by a hydrohalic acid), particularly halogeno having an atomic weight of 19 to 80, e.g. fluoro, chloro, bromo and the like, lower alkoxy-carbonyloxy, e.g. methoxycarbonyloxy, ethoxycarbonyloxy and the like, or lower alkanoyloxy, e.g. acetoxy, propionyloxy and the like, etherified mercapto, particularly lower alkylmercapto having preferably from one to four carbon atoms, e.g. methylmercapto, ethylmercapto and the like, nitro, amino, particularly N,N-disubstituted amino, such as N,N-di-lower alkyl-amino, e.g. N,N-dimethylamino, N-ethyl-N-methyl-amino, N,N-diethylamino and the like, polyhalogeno-lower alkyl, particularly trifluoromethyl and the like, or any other suitable functional group. Furthermore, two of the groups $R_4$, $R_5$ and $R_6$ in the formula, when substituting two neighboring positions and taken together, may also form a fused-on cyclic substituent. Such substituent may be represented, for example, by lower alkylenedioxy, e.g. methylenedioxy, 1,1-ethylenedioxy and the like, or any other analogous grouping.

The group $R_7$ in the previously-given formula, which stands primarily for hydrogen, may also represent lower alkyl, particularly methyl, as well as ethyl and the like.

Salts of the compounds present in the compositions of this invention are primarily therapeutically and pharmacologically acceptable, non-toxic acid addition salts, particularly those with inorganic acids, such as mineral acids, e.g. hydrochloric, hydrobromic, sulfuric, phosphoric acids and the like, as well as with organic acids, e.g. acetic, maleic, citric, tartaric, methane sulfonic, ethane sulfonic, 1,2-ethane disulfonic, p-toluene sulfonic acid and the like.

Also included within the scope of the present invention are compositions containing N-oxides of the above-described compounds, as well as the pharmacologically acceptable acid addition salts of such N-oxides, such as the addition salts with the above-mentioned inorganic, particularly mineral, and organic acids.

In view of the fact that several asymmetric carbon atoms are present in the compounds present in the compositions of this invention, the latter may be obtained in the form of a mixture of racemates, racemates or optically pure compounds.

Preferred compositions contain as the active ingredient one of the compounds of the formula:

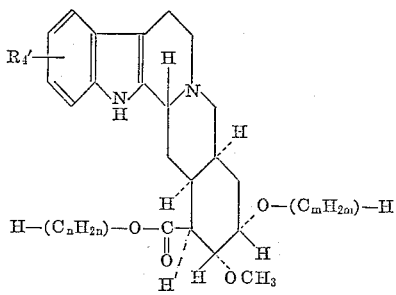

in which each of the letters $m$ and $n$ represents one of the whole numbers from one to seven, particularly from one to three, and $R_4'$ represents lower alkoxy having from one to four carbon atoms, particularly methoxy, as well as ethoxy, n-propyloxy, isopropyloxy, n-butyloxy and the like, whereby $R_4'$ is preferably attached to the 10-position or the 11-position, or the non-toxic, pharmacologically acceptable acid addition salts thereof.

These compounds are represented by the lower alkyl 18-epi-O-lower alkyl-reserpates, in which lower alkyl has from one to seven, especially from one to three carbon atoms, particularly by the methyl 18-epi-O-lower alkyl-reserpates, in which lower alkyl has from one to three carbon atoms, and is represented by methyl, ethyl, n-propyl or isopropyl, or the non-toxic pharmacologically acceptable acid addition salts thereof.

Other preferred compositions have as the active ingredient one of the compounds of the formula:

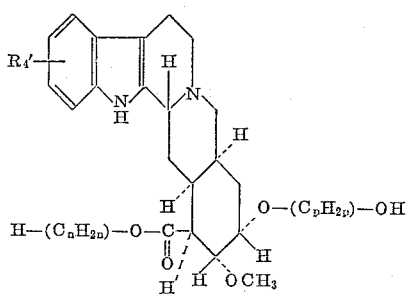

in which the letter $n$ represents one of the whole numbers from one to seven, particularly from one to three, and the letter $p$ stands for one of the whole numbers from two to seven, particularly from two to five, and in which the radical of the formula —$(C_pH_{2p})$— separates the two oxygen atoms attached to such radical by at least two carbon atoms, and $R_4'$ is lower alkoxy having from one to four carbon atoms, particularly methoxy, as well as ethoxy, n-propyloxy, isopropyloxy, n-butyloxy and the like, whereby $R_4'$ is preferably attached to the 10-position or the 11-position, or the non-toxic, pharmacologically acceptable acid addition salts thereof.

These compounds are primarily represented by the lower alkyl 18-epi-O-(hydroxy-lower alkyl)-reserpates, in which lower alkyl of the ester group has from one to seven, especially from one to three carbon atoms, and lower alkyl of the hydroxy-lower alkyl group has from two to seven, particularly from two to five carbon atoms separating the hydroxy group from the 18-oxygen atom by at least two carbon atoms, or the non-toxic, pharmacologically acceptable acid addition salts thereof, particularly by the methyl 18-epi-O-(hydroxy-lower alkyl)-reserpates, in which lower alkyl has from two to five carbon atoms separating the hydroxyl group from the 18-oxygen atom by at least two carbon atoms, or the non-toxic pharmacologically acceptable acid addition salts thereof.

Another group of compositions has as the active ingredient one of the compounds of the formula:

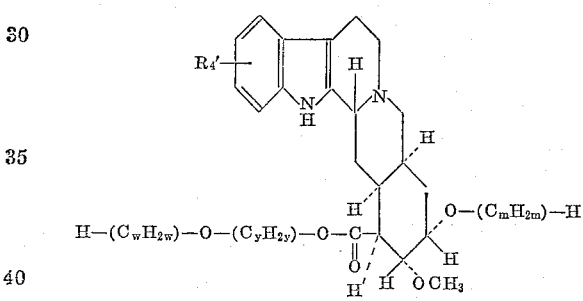

in which the letter $m$ stands for one of the whole numbers from one to seven, particularly from one to three, the letter $w$ stands for one of the whole numbers from one to four, and the letter $y$ stands for one of the whole numbers from two to three, and in which the radical of the formula —$(C_yH_{2y})$— separates the two oxygen atoms attached to such radical by at least two carbon atoms, and $R_4'$ represents lower alkoxy having from one to four carbon atoms, particularly methoxy, as well as ethoxy, n-propyloxy, isopropyloxy, n-butyloxy and the like, whereby $R_4'$ is preferably attached to the 10-position or the 11-position, or the non-toxic, pharmacologically acceptable acid addition salts thereof.

Compounds of the above type are primarily the lower alkoxy-lower alkyl 18-epi-O-lower alkyl-reserpates, in which lower alkyl substituting the 18-oxygen atom has from one to seven, especially from one to three carbon atoms, and lower alkyl of the lower alkoxy-lower alkyl group has from two to three carbon atoms, which separate the lower alkoxy group having from one to four carbon atoms, by at least two carbon atoms from the 16β-carboxyl group, or the non-toxic, pharmacologically acceptable acid addition salts thereof.

The present invention relates to animal feed compositions containing an effective amount of one of the above described 18α-etherified hydroxy-3-epi-allo-yohimbane 16β-carboxylic acid esters as the active ingredient, particularly one of the compounds having one of the previously-given formulae, especially a lower alkyl 18-epi-O-lower alkyl-reserpate, such as a methyl 18-epi-O-lower alkyl-reserpate, in which lower alkyl has from one to three carbon atoms, e.g. methyl 18-epi-O-methyl-reserpate, methyl 18-epi-O-ethyl-reserpate, methyl 18-epi-O-n-propyl-reserpate and the like, or primarily a pharmacologically acceptable acid addition salt thereof, e.g. hydrochloride, sulfate, maleate and the like, as well as an N-oxide or a salt of an N-oxide thereof, to cause acute or prolonged quieting of animals, such as livestock animals, e.g. cattle, horses, hogs, sheep, goats and the like, pets, e.g. dogs cats and the like, or, more especially poultry, e.g. chickens, turkeys, ducks, geese and the like. More particularly, such feed compositions contain from about 0.0001 g. to about 1.0 g. per 1000 g. of total feed composition of an 18α-etherified hydroxy-3-epi-allo-yohimbane 16β-carboxylic acid esters, particularly one of the compounds having one of the previously-given formulae, especially a lower alkyl 18-epi-O-lower alkyl-reserpate, such as a methyl 18-epi-O-lower alkyl-reserpate, in which lower alkyl has from one to three carbon atoms, e.g. methyl 18-epi-O-methyl-reserpate, methyl 18-epi-O-ethyl-reserpate, methyl 18-epi-O-n-propyl-reserpate and the like, or primarily the pharmacologically acceptable acid addition salts thereof, e.g. hydrochlorides, sulfates, maleates and the like, as well as the N-oxides or salts of the N-oxides.

The concentration of the active ingredient in the total feed composition depends largely on the type of treatment intended. Thus compositions ointended for one-time or short-term treatment have from about 0.01 g. to about 1.0 g., preferably from about 0.01 g. to about 0.25 g. per 1000 g. of total feed of the active ingredient, whereas compositions for prolonged treatment have from about 0.0001 g. to about 0.01 g., preferably from about 0.00025 g. to about 0.01 g. per 1000 g. of total feed of the essential ingredient. Furthermore, in proportion to their body weight, poultry, e.g. chickens and the like, have a greater feed-intake, i.e. need less concentrated medicated feed composition, whereas larger livestock, e.g. cattle, horses and the like, have a smaller feed-intake, i.e. need a more concentrated medicated feed.

Apart from the above-mentioned 18α-etherified hydroxy-3-epi-allo-yohimbane 16β-carboxylic acid ester compounds, the feed compositions contain the usual feed components, such as grains, protein supplements, mineral supplements, green feed vitamin supplements, antimicrobial agents, particularly antibiotics, and other useful substances in ratios and proportions known to be best adaptable to the particular feed. Examples of suitable feed constituents include barley, barley meal, buckwheat, corn, cornmeal, kafir, oats, oat groats, ground oats, rolled oats, rye, wheat, wheat bran, wheat shorts, wheat middlings, milk, bone meal, meat scrap, corn gluten meal, oil cake meal, soybean meal, fish meal, alfalfa, dehydrated alfalfa meal, clover, grass clippings, cabbage, kale, cod liver oil, and similar nutrients, as well as mineral supplements, such as di-calcium phosphate, calcium carbonate, iodized salt, manganese sulfate and the like, vitamins, e.g. vitamin A, niacin, calcium, pantothenate, thiamine, riboflavin, vitamin $B_{12}$, ascorbic acid, vitamin D and the like, other essential supplements, e.g. butylated hydroxytoluene, methionine and the like, antimicrobial agents, particularly antibiotics, e.g. bacitracin, penicillins, tetracycline, chlortetracycline, oxytetracycline, erythromycin and the like.

Preferably, a pre-mix containing the 18α-etherified hydroxy-3-epi-allo-yohimbane 16β-carboxylic acid ester compound, is formed together with a suitable carrier. Carrier substances are, for example, wheat middlings, starch, sucrose, lactose, mannitol, sodium gluconate, solvent extracted soybean feed or any other suitable blender; other auxiliary substances, such as buffers and buffer systems, e.g. citric acid-sodium citrate, sodium acetate, dipotassium phthalate-phthalic acid, sodium benzoate-benzoic acid, sodium lactate-lactic acid, sodium fumarate-fumaric acid and the like, sequestering agents, such as salts of ethylenediamine tetra-acetic acid, e.g. ethylenediamine tetra-acetic acid tetra-sodium salt, which may be in admixture with a small amount of the mono-sodium salt of N,N-bis-(2-hydroxyethyl)-glycine, and the like, or any other suitable agents, such as antioxidants, stabilizers and the like. A premix contains from about 0.1 to about 20 percent, more especially from 0.5 to about 10 percent of the active ingredient together with a suitable mixture of carrier and auxiliary substances.

The medicated feed composition is prepared according to standard procedures by adding the premix in amounts to make up the desired concentration of the active ingredient in the final medicated feed.

The present invention also includes drinkable aqueous solutions, containing an effective amount of one of the above-described 18α-etherified hydroxy-3-epi-allo-yohimbane 16β-carboxylic acid esters, particularly one of the compounds having one of the previously-given formulae, especially a lower alkyl 18-epi-O-lower alkyl-reserpate, such as a methyl 18-epi-O-lower alkyl-reserpate, in which lower alkyl has from one to three carbon atoms, e.g. methyl 18-epi-O-methyl-reserpate, methyl 18-epi-O-ethyl-reserpate, methyl 18-epi-O-n-propyl-reserpate and the like, or primarily the pharmacologically acceptable acid addition salts thereof, e.g. hydrochlorides, sulfates, maleates and the like, as well as the N-oxides or salts of the N-oxides, as the active ingredient to cause acute or prolonged quieting of animals, such as livestock animals, e.g. cattle, horses, hogs, sheep, goats and the like, pets, e.g. dogs, cats and the like, or, more especially, poultry, e.g. chickens, turkeys, ducks, geese and the like. More especially, such aqueous solutions contain from about 0.00001 percent to about 0.1 percent of an 18α-etherified hydroxy-3-epi-allo-yohimbane 16-carboxylic acid ester, particularly one of the compounds having one of the previously-given formulae, especially a lower alkyl 18-epi-O-lower alkyl-reserpate, such as a methyl 18-epi-O-lower alkyl-reserpate, in which lower alkyl has from one to three carbon atoms, e.g. methyl 18-epi-O-methyl-reserpate, methyl 18-epi-O-ethyl-reserpate, methyl 18-epi-O-n-propyl-reserpate and the like, or primarily the pharmacologically acceptable acid addition salts thereof, e.g. hydrochlorides, sulfates, maleates and the like, as well as the N-oxides or salts of the N-oxides.

Again the concentration of the active ingredient in such aqueous solutions depends largely on the type of treatment; thus, solutions intended for one-time or short-term treatment have from about 0.001 percent to about 0.1 percent, preferably from about 0.001 percent to about 0.025 percent of the active ingredient, whereas solutions for prolonged treatment have from about 0.00001 percent to about 0.001 percent preferably from about 0.000025 percent to about 0.001 percent of the essential ingredient.

The drinkable solutions are prepared simply by adding one of the above-described water-soluble 18α-etherified hydroxy-3-epi-allo-yohimbane 16β-carboxylic acid ester compounds or a suitable water-soluble premix preparation containing the active ingredient and a carrier, if necessary a buffer and/or other auxiliary substances, such as those described hereinbefore, to water and diluting the resulting solution to obtain the desired concentration.

The followng examples and experiments illustrate the invention and are not to be construed as being limitations thereon.

*Example 1*

A poultry feed containing methyl 18-epi-O-methyl-reserpate hydrochloride may be prepared as follows.

| Premix: | G. |
|---|---|
| Methyl 18-epi-O-methyl-reserpate hydrochloride | 44.000 |
| Wheat standard middlings, 30–80 mesh | 10,956.000 |
| | 11,000.000 |

The premix is made by adding the methyl 18-epi-O-methyl-reserpate hydrochloride to the wheat and then mixing until uniformity is obtained.

Feed formula:

| | G. |
|---|---|
| Corn meal | 1,062.875 |
| Fat | 80.000 |
| Fish meal, 60% protein | 100.000 |
| Soybean meal, 50% protein | 500.000 |
| Corn gluten meal | 100.000 |
| Dehydrated alfalfa meal | 50.000 |
| Corn distillers' solubles | 40.000 |
| Di-calcium phosphate | 28.000 |
| Calcium carbonate | 20.000 |
| Iodized salt | 10.000 |
| Vitamins A and D (1,000,000 A and 250,000 D/pound) | 4.000 |
| Calcium pantothenate | 0.250 |
| Butylated hydroxy toluene | 0.250 |
| Choline chloride, 25% | 2.500 |
| Riboflavin conc. (24 g. per pound) | 0.125 |
| Vitamin $B_{12}$ (0.02 g. per pound) | 1.000 |
| Methionine | 0.500 |
| Manganese sulfate | 0.500 |
| Total weight | 2,000.000 |

The feed formula is prepared as follows: A portion of the corn meal is introduced into the blending machine (about half of the amount to be added). The remaining corn meal, previously blended with the pre-heated, liquified fat, is added thereto and mixing is continued until uniformity is obtained. The manganese sulfate, di-calcium phosphate, calcium carbonate and iodized salt are then added with mixing, followed by the addition of the fish meal, soy bean meal, corn gluten meal and corn distiller solubles. After a uniform mixture has been obtained, vitamins A and D, calcium pantothenate, choline chloride, riboflavin, vitamin $B_{12}$ and methionine are added in that order. Mixing is continued after the addition of butylated hydroxy toluene, and maintained until a uniform product is obtained.

The premix is added to the feed formula prepared as described above in an amount sufficient to provide a concentration of 0.05 g. of methyl 18-epi-O-methyl-reserpate hydrochloride per 1000 g. of feed in the uniformly blended mix.

In the above preparation, methyl 18-epi-O-methyl-reserpate hydrochloride may be replaced by another 18α-etherified hydroxy-3-epi-allo-yohimbane 16β-carboxylic acid ester, N-oxide or a salt thereof, such as by another lower alkyl 18-epi-O-lower alkyl-reserpate, particularly another methyl 18-epi-O-lower alkyl-reserpate, e.g. methyl 18-epi-O-ethyl reserpate, methyl 18-epi-O-n-propyl-reserpate and the like, or a pharmacologically acceptable mineral acid addition salt thereof, e.g. hydrochloride, sulfate, maleate and the like.

*Example 2*

Another premix containing two percent of methyl 18-epi-O-methyl-reserpate hydrochloride may be prepared as follows (for 1000 g.):

Ingredients:

| | G. |
|---|---|
| Methyl 18-epi-O-methyl-reserpate hydrochloride | 23.00 |
| Sugar, confectioners' | 100.00 |
| Soybean feed, solvent extracted | 877.00 |

The ingredients are thoroughly mixed in appropriate mixing equipment. The premix is then added to the feed formula in desired quantities.

This premix may be blended with the feed formula described in Example 1 or any other suitable feed mixture, such as, for example, the following feed formula:

Feed formula:

| | G. |
|---|---|
| Alfalfa meal | 50.00 |
| Corn, yellow | 1215.00 |
| Corn gluten meal | 50.00 |
| Animal fat | 40.00 |
| Dried distillers' grains | 25.00 |
| Fish meal | 100.00 |
| Oyster shell | 15.00 |
| Poultry by-product meal | 100.00 |
| Soybean meal | 380.00 |
| Sodium chloride | 5.00 |
| Trace mineral premix | 0.50 |
| Di-calcium phosphate | 15.00 |
| Vitamin premix | 5.00 |
| | 2000.50 |

The feed mixture is prepared in a manner analogous to the one described in Example 1 and the premix is blended, with the feed formula using the amounts necessary to obtain a feed containing 0.05 percent of methyl 18-epi-O-methyl-reserpate hydrochloride.

In the above premix, methyl 18-epi-O-methyl-reserpate hydrochloride may be replaced by another 18α-etherified hydroxy-3-epi-allo-yohimbane 16β-carboxylic acid ester, an N-oxide or a salt thereof, such as by another lower alkyl 18-epi-O-lower alkyl-reserpate, particularly a methyl 18-epi-O-lower alkyl-reserpate, e.g. methyl 18-epi-O-ethyl-reserpate, methyl 18-epi-O-n-propyl-reserpate and the like, or, more especially, a pharmacologically acceptable acid addition salt, e.g. sulfate, hydrochloride, maleate and the like, thereof, as well as a lower alkyl 18-epi-O-lower alkyl-deserpidate or a lower alkyl 18-epi-O-lower alkyl-10-methoxy-deserpidate, or a pharmacologically acceptable acid addition salt thereof.

*Example 3*

An aqueous solution of 0.006 percent strength is prepared by adding 0.06 g. of methyl 18-epi-O-methyl-reserpate hydrochloride to sufficient water, shaking to ensure complete solution and adding water to bring the volume to a total of 1000 ml.

*Example 4*

An aqueous solution of 0.015 percent strength is prepared by adding 0.150 g. of methyl 18-epi-O-methyl-reserpate hydrochloride to sufficient water, shaking to ensure complete solution and adding water to bring the volume to a total of 1000 ml.

In the above solution, 18-epi-O-methyl-reserpate hydrochloride may be replaced by another 18α-etherified hydroxy-3-epi-allo-yohimbane 16β-carboxylic acid ester, N-oxide or a salt thereof, such as another lower alkyl 18-epi-O-lower alkyl-reserpate, particularly another methyl 18-epi-O-lower alkyl-reserpate, e.g. methyl 18-epi-O-ethyl-reserpate, methyl 18-epi-O-n-propyl-reserpate and the like, or a pharmacologically acceptable mineral acid addition salt thereof, e.g. hydrochloride, sulfate, maleate and the like.

*Example 5*

Instead of using the pure substance for making up the desired solutions as shown in the previous examples, a water-soluble premix may be prepared.

Ingredients:

| | G. |
|---|---|
| Methyl 18-epi-O-methyl-reserpate hydrochloride | 30.00 |
| A mixture of 93 percent of the tetrasodium salt of ethylene-diamine tetraacetic acid and 7 percent of the monosodium salt of N,N-di-(2-hydroxyethyl)-glycin | 30.00 |
| Citric acid, anhydrous | 70.00 |
| Sodium citrate, USP | 50.00 |
| Sucrose | 120.00 |
| | 300.00 |

An aqueous solution containing 0.015 percent of methyl 18-epi-O-methyl-reserpate hydrochloride may be prepared by dissolving 1.5 g. of the above premix in a sufficient epi-O-methyl-reserpate hydrochloride as the active ingredient; broiler-type chickens of two different age levels are used as test animals.

| G./1,000 g. of feed | Number of birds | Mean and body weight per bird (g.) | Mean feed intake per bird (g.) (3½ hours) | Time of onset (hours) | Depth | Duration (hours) |
|---|---|---|---|---|---|---|
| 0.05 | 6 | 840 | 28 | 2¾ | 2 | 4–4½ |
| 0.10 | 6 | 1,310 | 20 | 2¼ | 2 | 4–4½ | amount of water, the solution is thoroughly stirred and then diluted to bring the volume to 1000 ml.

Example 6

In the following tests with female leghorn chickens, 29 weeks of age, the drinking water is being withdrawn in the evening before each experiment. On the next morning, the drinking water containing different amounts of methyl 18-epi-O-methyl-reserpate hydrochloride is placed before the birds for two hours; after that period, the solution is removed.

The criteria for judging sedation are based upon the following five items:
(1) Comparison of treated chickens with control birds of the same age, hatch, breed and strain.
(2) Observation for obvious signs of sedation and tranquilization.
(3) Response to a sudden thrust of the hand.
(4) Ease of catching.
(5) Response to pulling of the tail feathers.

In the following table, the depth of sedation is recorded using the following code:
1. Appeared to be normally active.
2. Less active, quieter than the controls, sits about more, readily handled, puts up less struggle than the controls when tail feathers are pulled.
3. Sitting, reluctant to move, dozing from time to time. Some birds tuck head over wing while dozing, readily caught with some struggling after catching, but less than No. 2. When the tail feathers are pulled, the struggling and wing flapping is less than No. 2. Easily aroused, will take several steps, sit and doze again.
4. Sitting, dozing, head over wing, eyes closed, indifferent to a sudden rapid thrust of the hand, aroused with difficulty, after being aroused will take a step or two, sit, close eyes and doze again.

Example 9

A feed preparation for livestock animals may also be prepared by dispersing about 4000 ml. of a 0.5 percent aqueous solution of methyl 18-epi-O-methyl-reserpate hydrochloride in about 1000 g. to 1500 g. of feed; upon feeding such preparation to livestock animals the following results are observed:

(1) A cow (weighing about 350 kg.) is given a total dose of 0.75 g. of methyl 18-epi-O-methyl-reserpate hydrochloride in a feed mix. Within two hours, the animal is quiet and tractable without showing any change in heart rate or respiration.

(2) A bay gelding (weighing about 500 kg.) is given a total dose of 2.5 g. of methyl 18-epi-O-methyl-reserpate hydrochloride in a feed mix. Within four hours a definite change in gait can be observed indicating a slight ataxia, and the animal has a calmer expression. In the exercise area, when left alone, the horse lies down, which is an unusual occurrence during the day, and can be handled (opening of the mouth and the like) without difficulty. No drug effects are observed after 24 hours.

Example 10

The 18α-etherifed hydroxy-3-epi-allo-yohimbane 16β-carboxylic acid esters, salts, N-oxides or salts of N-oxides thereof present in the compositions of this invention, may be prepared, for example, by subjecting an 18β-organic sulfonyloxy-3-epi-allo-yohimbane 16β-carboxylic acid ester, a salt, an N-oxide or a salt of an N-oxide thereof, to solvolysis with an alcohol, and, if desired, converting a resulting compound into a salt, an N-oxide or a salt of an N-oxide thereof.

The organic portion of the organic sulfonyloxy group is primarily a monocyclic carbocyclic aryl group, which may be represented by phenyl, or, more particularly, by

| Aqueous solution (percent) | Number of birds | Body weight of bird (g.) | Solution intake per bird (ml.) | Time of onset (hours) | Depth | Duration (hours) |
|---|---|---|---|---|---|---|
| 0.015 | 2 | 1,585, 1,252 | 35 | 1 | 3 | 5 |
| 0.015 | 2 | 1,588, 1,594 | 58 | 1 | 2 | 4½–5 |
| 0.0075 | 2 | 1,366, 1,471 | 30 | 1 | 2 | 4 |
| 0.0075 | 2 | 1,312, 1,452 | 95 | 1 | 2 | 4 |

Example 7

The female leghorn chickens are replaced by female and male turkeys, 22 weeks of age; the test is carried out as shown in Example 6.

substituted phenyl. The latter is preferably a phenyl radical substituted in the 2-position, 3-position and/or the 4-position by an electron-withdrawing substituent, particularly nitro or halogeno, such as bromo, as well as

| Aqueous solution (percent) | Number of birds | Mean and body weight per bird (g.) | Solution intake per two birds (ml.) | Time of onset (hours) | Depth | Duration |
|---|---|---|---|---|---|---|
| 0.004 | 1 male / 1 female | 8,240 / 6,090 | Total of 380 ml. | 2 | 1 | 3–4 |
| 0.006 | 1 male / 1 female | 9,300 / 5,700 | Total of 460 ml. | 1 to 1½ | 2 | 3½–4 |
| 0.008 | 1 male / 1 female | 7,700 / 5,890 | Total of 380 ml. | 1 to 1½ | 2 | 5 |
| 0.016 | 1 male / 1 female | 9,400 / 5,830 | Total of 440 ml. | 1 | 3–4 | 5 |

Example 8

In the following experiment, the aqueous solutions are replaced by feed compositions containing methyl 18- fluoro, chloro or iodo, or carbo-lower alkoxy, e.g. carbomethoxy, carbethoxy and the like, carbamyl, cyano or any other suitable group. Lower alkyl, especially methyl and the like, also represents a possible substituent. The organic portion may, therefore, be represented by phenyl, or primarily by halogeno-phenyl, e.g. 4-bromo-phenyl and the like, or nitro-phenyl, e.g. 3-nitro-phenyl, 4-nitrophenyl and the like, as well as cyano-phenyl, e.g. 4-cyano-phenyl and the like, or di-substituted or tri-substituted phenyl radicals containing such groups. The organic radical may also stand for other organic radicals, such as an aliphatic radical, for example, lower alkyl, e.g. methyl, ethyl and the like.

Solvolysis with the alcohol may be carried out in the absence, but more preferably in the presence of an alcoholysis reagent, particularly of a base of medium strength. Such reagent is represented by an amine, for example, a tertiary amine, especially an aliphatic tertiary amine, such as an N,N,N-tri-lower alkyl-amine, e.g.

N,N,N-trimethylamine,
N-ethyl-N,N-dimethylamine,
N,N-diethyl-N-methylamine,
N,N,N-triethylamine and the like, an
N,N,N',N'-tetra-lower alkyl-lower alkylene-diamine, e.g.
N,N,N'N'-tetramethyl-1,5-pentylene-diamine,
N,N,N',N'-tetramethyl-1,6-hexylenediamine,
N,N,N',N'-tetramethyl-1,7-heptylene-diamine and the like,
a 1-lower alkyl-N,N-alkyleneimine, in which alkylene contains from four to six carbons atoms, e.g.
1-methyl-pyrrolidine,
1-methyl-piperidine,
1-ethyl-piperidine,
1-methyl-N,N-hexamethylene-imine and the like,
4-lower alkyl-morpholine, e.g.
4-methylmorpholine,
4-ethyl-morpholine and the like,
1,4-di-lower alkyl-piperazine, e.g.
1,4-dimethyl-piperazine and the like, or any other suitable aliphatic tertiary amine, as well as a heterocyclic base containing a tertiary nitrogen atom, e.g. pyridine, collidine and the like, or any other suitable base.

Solvolysis with an alcohol, for example, a lower alkanol or any other suitable alcohol, is carried out while using the alcohol as the diluent; any other inert solvent such as, for example, p-dioxane and the like, may be added to ensure complete solution. The reaction is preferably completed at an elevated temperature, if necessary, in a closed vessel under an increased pressure, and/or in the atmosphere of an inert gas, e.g. nitrogen.

The above solvolysis reaction proceeds with inversion, i.e. the 18β-organic sulfonyloxy-3-epi-allo-yohimbane 16β-carboxylic acid ester yields upon solvolysis according to the above procedure the 18α-etherified hydroxy-3-epi-allo-yohimbane 16β-carboxylic acid ester.

The 18β-organic sulfonyloxy-3-epi-allo-yohimbane 16β-carboxylic acid esters, salts, N-oxides or salts of N-oxides may be prepared according to known methods, for example, by esterification of an 18β-hydroxy-3-epi-alloyohimbane 16β-carboxylic acid ester with an organic sulfonyl halide, particularly a monocyclic aryl sulfonyl halide, such as benzene sulfonyl chloride, or a substituted benzene sulfonyl chloride, or a substituted benzene sulfonyl chloride, e.g. 3-nitro-benzene sulfonyl chloride, 4-nitro-benzene sulfonyl chloride, 4-bromo-benzene sulfonyl chloride and the like, in the presence of a base, particularly an organic tertiary base, e.g. pyridine, collidine and the like. In the esterification step, the base, such as, for example, pyridine and the like, may also serve as the diluent; other suitable, inert solvents may be added, if necessary. The reaction is carried out under cooling or at room temperature, preferably under the exclusion of moisture.

The above-described general procedure may be illustrated by the following example:

To a solution of 10.0 g. of methyl reserpate in 70 ml. of pyridine is added 15.8 g. of 4-bromo-benzene sulfonyl chloride; the reaction mixture is allowed to stand at room temperature for 2½ days and is then poured into ice-water. The organic material is extracted with chloroform, the organic extract is washed with a 5 percent aqueous sodium hydroxide solution and subsequently with water until a neutral reaction is obtained. The organic solution is evaporated to dryness, and the resulting methyl 18-O-(4-bromo-phenyl-sulfonyl)-reserpate is recrystallized from acetone, M.P. 209–212°; yield, 5.64 g.

A mixture of 1.9 g. of methyl 18-O-(4-bromo-phenyl-sulfonyl)-reserpate, 0.36 g. of N,N,N-triethylamine and 240 ml. of methanol is sealed in a thick-walled hydrogenation bottle after squirting with nitrogen. The reaction mixture is heated on the steam-bath for 21 hours; the light yellow solution is evaporated, the residue is extracted into methylene chloride, and the organic solution is washed with a 5 percent aqueous sodium carbonate solution and subsequently with a saturated aqueous chloride solution, and is then dried and evaporated to yield a tan solid, which is muddled with diethyl ether. The latter is dissolved in a 1:2-mixture of benzene and cyclohexane, the solution is passed through charcoal, and the filtrate is evaporated to a small volume, whereupon crystallization occurs. The resulting methyl 18-epi-O-methyl-reserpate melts at 241–244° (with decomposition); yield: 0.86 g.

The methanol used in the above alcoholysis may be replaced by other lower alkanols, e.g. ethanol, n-propanol, isopropanol, n-butanol and the like; upon treatment of a methyl 18-O-(organic sulfonyl)-reserpate, such as methyl 18-O-(4-bromo - phenyl - sulfonyl) - reserpate, with such alcohols, other methyl 18-epi-O-lower alkyl-reserpates, e.g. methyl 18-epi-O - ethyl - reserpate (M.P. 229–230°), methyl 18-epi-O-n-propyl-reserpate (M.P. 223–225°), methyl 18-epi-isopropyl-reserpate (M.P. 225–229°), methyl 18-epi-n-butyl reserpate (M.P. 224–226°) and the like, may be prepared.

To a solution of 6.35 g. of ethyl 18-epi-O-methyl-reserpate in 100 ml. of acetone is added a solution of 1.4 ml. of concentrated hydrochloric acid in 16 ml. of acetone. A gel-like material precipitates immediately, which on scratching becomes crystalline. The mixture is chilled in an ice-bath for thirty minutes, the solid material is filtered off and washed with cold acetone to yield the desired methyl 18-epi-O-methyl-reserpate hydrochloride, M.P. 239–242° (decomposition).

Other salts, such as the methyl 18-epi-O-ethyl-reserpate hydrochloride (M.P. 233–235°), methyl 18-epi-O-n-propyl-reserpate hydrochloride (M.P. 213–223°), methyl 18-epi-O-ethyl-reserpate maleate hemihydrate (M.P. 195–197°), methyl 18-epi-O-n-propyl-reserpate sulfate monohydrate (M.P. 202–207°, with decomposition), methyl 18-epi-O-n-propyl-reserpate maleate hemihydrate (M.P. 196–198°, with decomposition) and the like, may be prepared accordingly.

Other compounds, which may replace the previously-shown specific 18α-etherified hydroxy-3-epi-allo-yohimbane 16β-carboxylic acid esters are, for example, methyl 18-epi-O-n-pentyl-reserpate,
ethyl 18-epi-O-methyl-reserpate,
ethyl 18-epi-O-ethyl-reserpate,
ethyl 18-epi-O-n-propyl-reserpate,
ethyl 18-epi-O-n-butyl-reserpate,
n-propyl 18-epi-O-methyl-reserpate,
n-propyl 18-epi-O-ethyl-reserpate,
n-propyl 18-epi-O-n-propyl-reserpate,
isopropyl 18-epi-O-methyl-reserpate,
isopropyl 18-epi-O-n-propyl-reserpate,
n-butyl 18-epi-O-methyl-reserpate,
n-butyl 18-epi-O-ethyl-reserpate,
isobutyl 18-epi-O-methyl-reserpate,
n-pentyl 18-epi-O-methyl-reserpate,
n-hexyl 18-epi-O-methyl-reserpate,
methyl 9-methoxy-18-O-methyl-deserpidate, methyl 18-epi-O-ethyl-9-methoxy-deserpidate,
methyl 9-methoxy-18-epi-O-n-propyl-deserpidate,
ethyl 9-methoxy-18-epi-O-methyl-deserpidate,
methyl 10-methoxy-18-epi-O-methyl-deserpidate,
methyl 18-epi-O-ethyl-10-methoxy-18-epi-O-methyl-deserpidate,
isopropyl 10-methoxy-18-epi-O-methyl-deserpidate,
methyl 11-ethoxy-18-epi-O-methyl-deserpidate,
methyl 11-ethoxy-18-epi-O-ethyl-deserpidate,
methyl 18-epi-O-methyl-11-n-propyloxy-deserpidate,
methyl 18-epi-O-ethyl-11-n-propyloxy-deserpidate,
methyl 11-isopropyloxy-18-epi-O-methyl-deserpidate,
ethyl 11-isopropyloxy-18-epi-O-methyl-deserpidate,
methyl 11-n-butyloxy-18-epi-O-methyl-deserpidate,
methyl 11-n-butyloxy-18-epi-O-ethyl-deserpidate,
methyl 12-methoxy-18-epi-O-methyl-deserpidate,
ethyl 12-methoxy-18-epi-O-methyl-deserpidate,
methyl 18-epi-O-methyl-deserpidate,
methyl 18-epi-O-ethyl-deserpidate,
methyl 18-epi-O-n-propyl-deserpidate,
methyl 18-epi-O-isopropyl-deserpidate,
methyl 18-epi-O-n-butyl-deserpidate,
methyl 18-epi-O-secondary butyl-deserpidate,
ethyl 18-epi-O-methyl-deserpidate,
ethyl 18-epi-O-ethyl-deserpidate,
ethyl 18-epi-O-n-propyl-deserpidate,
n-propyl 18-epi-O-methyl-deserpidate,
n-propyl 18-epi-O-ethyl-deserpidate,
isopropyl 18-epi-O-methyl-deserpidate,
isopropyl 18-epi-O-n-butyl-deserpidate,
n-butyl 18-epi-O-methyl-deserpidate,
secondary butyl 18-epi-O-methyl-deserpidate,
n-pentyl 18-epi-O-methyl-deserpidate,
methyl 5-methyl-18-epi-O-methyl-reserpate,
methyl 18-epi-O-ethyl-5-methyl-reserpate,
ethyl 5-methyl-18-epi-O-methyl-reserpate,
methyl 6-methyl-18-epi-O-methyl-reserpate,
methyl 18-epi-O-n-butyl-6-methyl-reserpate,
ethyl 6-methyl-18-epi-O-methyl-reserpate,
methyl 6-methyl-18-epi-O-methyl-deserpidate,
methyl 6-methyl-18-epi-O-n-propyl-deserpidate,
ethyl 6-methyl-18-epi-O-methyl-deserpidate,
methyl 9-methyl-18-epi-O-methyl-deserpidate,
methyl 9-methyl-18-epi-O-ethyl-deserpidate,
n-propyl 9-methyl-18-epi-O-methyl-deserpidate,
methyl 11-methyl-18-epi-O-methyl-deserpidate,
ethyl 11-methyl-18-epi-O-methyl-deserpidate,
ethyl 11-methyl-18-epi-O-n-butyl-deserpidate,
methyl 10-methoxy-18-epi-O-methyl-reserpate,
methyl 18-epi-O-ethyl-10-methoxy-reserpate,
ethyl 10-methoxy-18-epi-O-n-propyl-reserpate,
methyl 9,10-dimethoxy-18-epi-O-ethyl-reserpate,
ethyl 9,10-dimethoxy-10-epi-O-methyl-reserpate,
methyl 18-epi-O-methyl-10,11-methylenedioxy-deserpidate,
ethyl 18-epi-O-methyl-10,11-methylenedioxy-deserpidate,
methyl 10-benzyloxy-18-epi-O-methyl-deserpidate,
methyl 10-benzyloxy-18-epi-O-ethyl-deserpidate,
ethyl 10-benzyloxy-18-epi-O-methyl-deserpidate,
methyl 11-benzyloxy-18-epi-O-methyl-deserpidate,
methyl 11-benzyloxy-18-epi-O-ethyl-deserpidate,
ethyl 11-benzyloxy-18-epi-O-methyl-deserpidate,
methyl 18-epi-O-methyl-11-methylmercapto-deserpidate,
methyl 18-epi-O-ethyl-11-methylmarcapto-deserpidate,
ethyl 18-epi-O-methyl-11-methylmercapto-deserpidate,
methyl 11-ethylmercapto-18-epi-O-methyl-deserpidate,
ethyl 18-epi-O-ethyl-11-ethylmercapto-deserpidate,
n-propyl 11-ethylmercapto-18-epi-O-methyl-deserpidate,
methyl 11-fluoro-18-epi-O-methyl-deserpidate,
methyl 11-fluoro-18-epi-O-ethyl-deserpidate,
ethyl 11-fluoro-18-epi-O-methyl-deserpidate,
methyl 10-chloro-18-epi-O-methyl-deserpidate,
methyl 10-chloro-18-epi-O-ethyl-deserpidate,
ethyl 10-chloro-18-epi-O-n-butyl-deserpidate,
methyl 10-bromo-18-epi-O-methyl-reserpate,
methyl 10-bromo-18-epi-O-ethyl-reserpate,
ethyl 10-bromo-18-epi-O-ethyl-reserpate,
methyl 17α-desmethoxy-17α-ethoxy-18-epi-O-methyl-reserpate,
methyl 17α-desmethoxy-17α-ethoxy-18-epi-O-ethyl-reserpate,
methyl 17α-desmethoxy-18-epi-O-methyl-17α-n-propyloxy-reserpate,
ethyl 17α-desmethoxy-18-epi-O-methyl-17α-n-propyloxy-reserpate,
methyl 17α-desmethoxy-17α-isopropyloxy-18-epi-O-methyl-reserpate,
methyl 17α-desmethoxy-18-epi-O-ethyl-17α-isopropyloxy-reserpate,
methyl 17α-desmethoxy-17α-ethoxy-18-epi-O-methyl-deserpidate,
methyl 17α-desmethoxy-17α-ethoxy-18-epi-O-ethyl-deserpidate,
ethyl 17α-desmethoxy-17α-ethoxy-18-epi-O-ethyl-deserpidate,
methyl 17α-cyano-17α-desmethoxy-18-epi-O-methyl-reserpate,
methyl 17α-cyano-17α-desmethoxy-8-epi-O-ethyl-reserpate,
methyl 17α-cyano-17α-desmethoxy-18-epi-O-methyl-deserpidate,
methyl 17α-cyano-17α-desmethoxy-18-epi-O-ethyl deserpidate,
methyl 18-epi-O-(2-hydroxyethyl)-reserpate,
methyl 18-epi-O-(3-hydroxypropyl)-reserpate,
methyl 18-epi-O-(4-hydroxybutyl)-reserpate,
2-methoxyethyl 18-epi-O-methyl-reserpate,
2-methoxyethyl 18-epi-O-ethyl-reserpate,
2-ethoxyethyl 18-epi-O-methyl-reserpate,
2-ethoxyethyl 18-epi-n-propyl-reserpate,
2-methoxypropyl 18-epi-O-methyl reserpate,
3-methoxypropyl 18-epi-O-methyl reserpate,
2-methoxyethyl 18-epi-O-methyl deserpidate,
2-methoxyethyl 18-epi-O-ethyl-deserpidate,
2-ethoxyethyl 18-epi-O-methyl-deserpidate,
2-N,N-dimethylaminoethyl 18-epi-O-methyl-reserpate,
2-N,N-dimethylaminoethyl 18-epi-O-ethyl-reserpate,
2-N,N-diethylaminoethyl 18-epi-O-methyl-reserpate,
3-N,N-dimethylaminopropyl 18-epi-O-methyl-reserpate,
2-N,N-dimethylaminoethyl 18-epi-O-methyl-deserpidate,
2-N,N-dimethylaminoethyl-18-epi-O-ethyl-deserpidate,
2-N,N-dimethylaminopropyl 18-epi-O-methyl-deserpidate and the like, or especially the non-toxic, pharmacologically acceptable acid addition salts thereof.

This application is a continuation in part of our applications Serial No. 46,911, filed August 2, 1960, and Serial No. 80,007, filed January 3, 1961, both now abandoned.

What is claimed is:

1. An animal quieting composition consisting essentially of an animal feed and a member selected from the group consisting of a compound of the formula

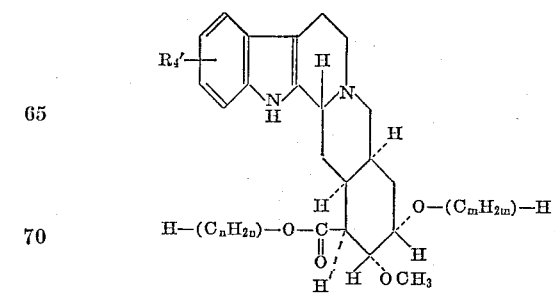

in which each of the letters $m$ and $n$ is an integer from one to seven, and $R_4'$ is lower alkoxy, and a pharmacologically acceptable acid addition salt of such compound, having from about 0.0001 g. to about 1.0 g. of the quieting ingredient per 1000 g. of total feed.

2. An animal quieting composition for short term treatment consisting essentially of an animal feed and a member selected from the group consisting of a compound of the formula

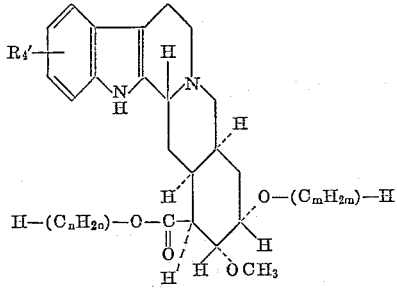

in which each of the letters $m$ and $n$ is an integer from one to seven, and $R_4'$ is lower alkoxy, and a pharmacologically acceptable acid addition salt of such compound, having from about 0.01 g. to about 1.0 g. of the quieting ingredient per 1000 g. of total feed.

3. An animal quieting composition for short term treatment consisting essentially of an animal feed and a member selected from the group consisting of lower alkyl 18-epi-O-lower alkyl-reserpate and a pharmacologically acceptable acid addition salt of such compound, having from about 0.01 g. to about 1.0 g. of the quieting ingredient per 1000 g. of total feed.

4. An animal quieting composition for short term treatment consisting essentially of an animal feed and a member selected from the group consisting of methyl 18-epi-O-lower alkyl-reserpate and a pharmacologically acceptable acid addition salt thereof, having from about 0.01 g. to about 0.25 g. of the quieting ingredient per 1000 g. of total feed.

5. An animal quieting composition for short term treatment consisting essentially of an animal feed and a pharmacologically acceptable acid addition salt of methyl 18-epi-O-methyl-reserpate, having from about 0.01 g. to about 0.25 g. of the quieting ingredient per 1000 g. of total feed.

6. An animal quieting composition for prolonged treatment consisting essentially of an animal feed and a member selected from the group consisting of a compound of the formula

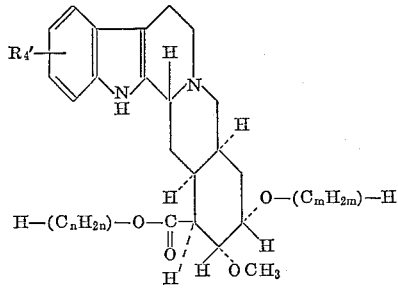

in which each of the letters $m$ and $n$ is an integer from one to seven, and $R_4'$ is lower alkoxy, and a pharmacologically acceptable acid addition salt of such compound, having from about 0.0001 g. to about 0.01 g. of the quieting ingredient per 1000 g. of total feed.

7. An animal quieting composition for prolonged treatment consisting essentially of an animal feed and a member selected from the group consisting of lower alkyl 18-epi-O-lower alkyl-reserpate and a pharmacologically acceptable acid addition salt of such compound, having from about 0.0001 g. to about 0.01 g. of the quieting ingredient per 1000 g. of total feed.

8. An animal quieting composition for prolonged treatment consisting essentially of an animal feed and a member selected from the group consisting essentially of animal feed and a member selected from the group consisting of methyl 18-epi-O-lower alkyl-reserpate and a pharmacologically acceptable acid addition salt thereof, having from about 0.00025 g. to about 0.01 g. of the quieting ingredient per 1000 g. of total feed.

9. An animal quieting composition for prolonged treatment consisting essentially of an animal feed and a pharmacologically acceptable acid addition salt of methyl 18-epi-O-methyl-reserpate, having from about 0.00025 g. to about 0.01 g. of the quieting ingredient per 1000 g. of total feed.

10. An animal quieting composition consisting essentially of a drinkable aqueous vehicle and a member selected from the group consisting of a compound of the formula

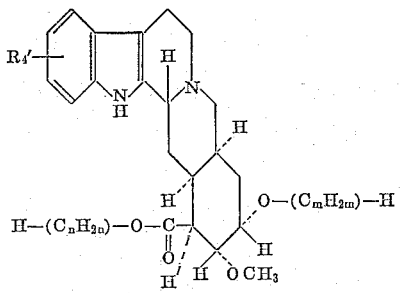

in which each of the letters $m$ and $n$ is an integer from one to seven, and $R_4'$ is lower alkoxy, and a pharmacologically acceptable acid addition salt of such compound, having about 0.00001 percent to about 0.1 percent of the quieting ingredient.

11. An animal quieting composition for short term treatment consisting essentially of a drinkable aqueous vehicle and a member selected from the group consisting of a compound of the formula

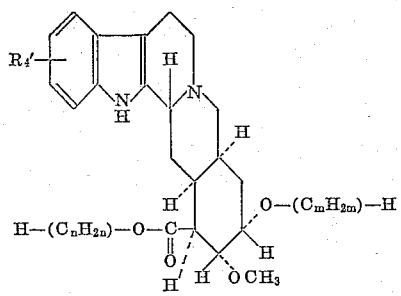

in which each of the letters $m$ and $n$ is an integer from one to seven, and $R_4'$ is lower alkoxy, and a pharmacologically acceptable acid addition salt of such compound, having from about 0.001 percent to about 0.1 percent of the quieting ingredient.

12. An animal quieting composition for short term treatment consisting essentially of a drinkable aqueous vehicle and a member selected from the group consisting of lower alkyl 18-epi-O-lower alkyl-reserpate and a pharmacologically acceptable acid addition salt of such compound, having from about 0.001 percent to about 0.1 percent of the quieting ingredient.

13. An animal quieting composition for short term treatment consisting essentially of a drinkable aqueous vehicle and a member selected from the group consisting of methyl 18-epi-O-lower alkyl-reserpate and a pharmacologically acceptable acid addition salt thereof, having from about 0.001 percent to about 0.025 percent of the quieting ingredient.

14. An animal quieting composition for short term treatment consisting essentially of a drinkable aqueous vehicle and a pharmacologically acceptable acid addition salt of methyl 18-epi-O-methyl-reserpate, having from about 0.001 percent to about 0.025 percent of the quieting ingredient.

15. An animal quieting composition for prolonged treatment consisting essentially of a drinkable aqueous vehicle and a member selected from the group consisting of a compound of the formula

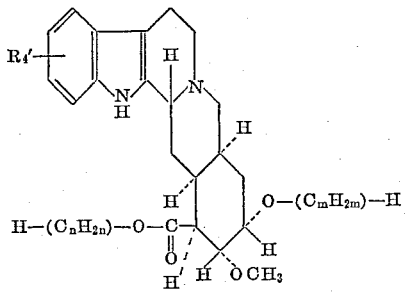

in which each of the letters $m$ and $n$ is an integer from one to seven, and $R_4'$ is lower alkoxy, and a pharmacologically acceptable acid addition salt of such compound, having from about 0.00001 percent to about 0.001 percent of the quieting ingredient.

16. An animal quieting composition for prolonged treatment consisting essentially of a drinkable aqueous vehicle and a member selected from the group consisting of lower alkyl 18-epi-O-lower alkyl-reserpate and a pharmacologically acceptable acid addition salt of such compound, having from about 0.00001 percent to about 0.001 percent of the quieting ingredient.

17. An animal quieting composition for prolonged treatment consisting essentially of a drinkable aqueous vehicle and a member selected from the group consisting of methyl 18-epi-O-lower alkyl-reserpate and a pharmacologically acceptable acid addition salt of such compound, having from about 0.000025 percent to about 0.001 percent of the quieting ingredient.

18. An animal quieting composition for prolonged treatment consisting essentially of a drinkable aqueous vehicle and a pharmacologically acceptable acid addition salt of methyl 18-epi-O-methyl-reserpate, having from about 0.000025 percent to about 0.001 percent of the quieting ingredient.

19. A method for quieting animals which comprises orally administering an animal quieting composition consisting essentially of an animal feed and a member selected from the group consisting of a compound of the formula

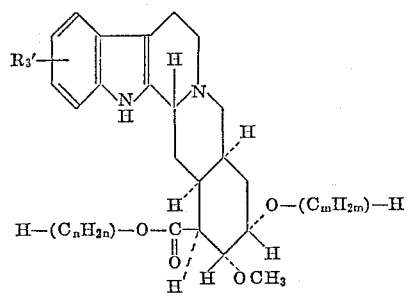

in which each of the letters $m$ and $n$ is an integer from one to seven, and $R_4'$ is lower alkoxy, and a pharmacologically acceptable acid addition salt of such compound, having from about 0.0001 g. to about 1.0 g. of the quieting ingredient per 1000 g. of total feed.

20. A method for quieting animals which comprises orally administering an animal quieting composition consisting essentially of a drinkable aqueous vehicle and a member selected from the group consisting of a compound of the formula

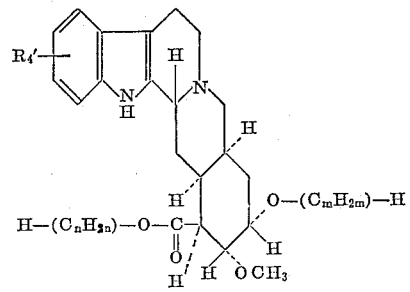

in which each of the letters $m$ and $n$ is an integer from one to seven, and $R_4'$ is lower alkoxy, and a pharmacologically acceptable acid addition salt of such compound having from about 0.00001 percent to about 0.1 percent of the quieting ingredient.

References Cited in the file of this patent

Wornick: Cereal Science Today, vol. 3, September 1958, pages 179 and 180 (99–2G).